(12) United States Patent
Hajati et al.

(10) Patent No.: US 11,815,677 B1
(45) Date of Patent: Nov. 14, 2023

(54) DISPLAY USING SCANNING-BASED SEQUENTIAL PUPIL EXPANSION

(71) Applicant: Apple Inc., Cupertino, CA (US)

(72) Inventors: Arman Hajati, San Mateo, CA (US); Alexander Shpunt, Portola Valley, CA (US); Robert S. Upton, Mountain View, CA (US); Yuval Gerson, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 468 days.

(21) Appl. No.: 16/871,069

(22) Filed: May 11, 2020

Related U.S. Application Data (60) Provisional application No. 62/847,970, filed on May 15, 2019.

(51) Int. Cl.
*G02B 27/00* (2006.01)
*G02B 27/01* (2006.01)
*G02B 26/10* (2006.01)

(52) U.S. Cl.
CPC .......... *G02B 27/0081* (2013.01); *G02B 26/105* (2013.01); *G02B 27/0172* (2013.01)

(58) Field of Classification Search
CPC ... G02B 6/26; G02B 6/4259; G02B 2006/0098; G02B 27/30; G02B 6/4214; G02B 26/105; G02B 27/0081; G02B 6/0031
See application file for complete search history.

(56) References Cited

U.S. PATENT DOCUMENTS

| | | | |
|---|---|---|---|
| 4,084,883 A | 4/1978 | Eastman et al. | |
| 5,076,664 A | 12/1991 | Migozzi | |
| 6,577,411 B1 | 6/2003 | David | |
| 6,798,579 B2 | 9/2004 | Robinson et al. | |
| 6,829,095 B2 | 12/2004 | Amitai | |
| 7,613,373 B1* | 11/2009 | DeJong | G02B 27/0938 359/636 |
| 8,237,760 B2 | 8/2012 | Nihei et al. | |
| 8,976,363 B2 | 3/2015 | Bendall et al. | |
| 9,025,253 B2 | 5/2015 | Hadad et al. | |
| 9,297,996 B2 | 3/2016 | Bohn et al. | |
| 9,329,080 B2 | 5/2016 | Shpunt et al. | |
| 10,003,168 B1 | 6/2018 | Villeneuve | |
| 10,488,746 B2 | 11/2019 | Pertierra et al. | |
| 2003/0011751 A1 | 1/2003 | Sakata et al. | |
| 2006/0221022 A1 | 10/2006 | Hajjar | |

(Continued)

FOREIGN PATENT DOCUMENTS

EP  3550329 A1  10/2019

OTHER PUBLICATIONS

Hajati et al., U.S. Appl. No. 16/871,063 filed May 11, 2020.
Hajati et al., U.S. Appl. No. 16/871,068 filed May 11, 2020.

(Continued)

*Primary Examiner* — Kimberly N. Kakalec
(74) *Attorney, Agent, or Firm* — KLIGLER & ASSOCIATES PATENT ATTORNEYS LTD (57) ABSTRACT

Image projection apparatus includes an image generating assembly, which is configured to project a sequence of line images extending in a first direction. A scanning mirror is positioned to receive and to reflect the line images while rotating about a mirror axis parallel to the first direction. A pupil expander has an edge positioned to receive the line images reflected by the scanning mirror and a face extending in a second direction non-parallel to the first direction and to the edge, and which is configured to direct simultaneously through the face multiple, parallel replicas of the expanded line images arrayed along the second direction.

20 Claims, 9 Drawing Sheets

(56) References Cited

U.S. PATENT DOCUMENTS

| | | | |
|---|---|---|---|
| 2007/0153866 A1 | 7/2007 | Shchegrov et al. | |
| 2007/0159673 A1 | 7/2007 | Freeman et al. | |
| 2011/0134017 A1* | 6/2011 | Burke | G02B 27/0101 345/32 |
| 2012/0062850 A1* | 3/2012 | Travis | G02B 27/0172 353/121 |
| 2014/0146394 A1 | 5/2014 | Tout et al. | |
| 2016/0341964 A1 | 11/2016 | Amitai | |
| 2017/0176596 A1 | 6/2017 | Shpunt et al. | |
| 2018/0074316 A1* | 3/2018 | Burkhardt et al. | G02B 27/0103 |
| 2018/0081168 A1 | 3/2018 | Shpunt et al. | |
| 2018/0120559 A1 | 5/2018 | Yeoh et al. | |
| 2019/0094981 A1 | 3/2019 | Bradski et al. | |
| 2019/0227319 A1 | 7/2019 | Trail et al. | |
| 2019/0348585 A1 | 11/2019 | Woodgate et al. | |
| 2019/0369405 A1 | 12/2019 | Chen et al. | |
| 2020/0278538 A1* | 9/2020 | Taylor et al. | G02B 27/0172 |
| 2020/0348418 A1 | 11/2020 | Sutton et al. | |

OTHER PUBLICATIONS

U.S. Appl. No. 16/871,063 Office Action dated Apr. 13, 2022.
U.S. Appl. No. 16/871,068 Office Action dated May 13, 2021.
U.S. Appl. No. 17/134,569 Office Action dated Sep. 20, 2021.

\* cited by examiner

DISPLAY USING SCANNING-BASED SEQUENTIAL PUPIL EXPANSION

CROSS-REFERENCE TO RELATED APPLICATION

This application claims the benefit of U.S. Provisional Pat. Application 62/847,970, filed May 15, 2019, which is incorporated herein by reference.

FIELD OF THE INVENTION

The present invention relates generally to optoelectronic systems, and particularly to methods and devices for image projection.

BACKGROUND

Image projection devices are used to project electronically generated images either onto a screen or directly into the eye of an observer. For example, virtual reality (VR) systems project an image to be viewed by an observer in, for example, game and educational applications. Augmented reality (AR) systems combine the image generated by a VR system with the scene observed passively through the AR system in applications such as, for example, surgery and complicated mechanical assembly.

Image projection devices may emit light of different wavelengths from multiple sources, which may appear as different colors. (The terms "optical radiation" and "light" as used in the present description and in the claims refer generally to any and all of visible, infrared, and ultraviolet radiation.) In visual display applications it is customary to refer to the three wavelength ranges of red, green, and blue as RGB, wherein the central wavelengths of the ranges are, for example, 640 nm for red, 532 nm for green, and 450 nm for blue. Depending on the types of sources that are used, the RGB wavelengths may also comprise spectral bands around the central wavelengths, with widths of 10 nm, 20 nm, or more.

SUMMARY

Embodiments of the present invention that are described herein provide improved apparatus and methods for optical scanning, delivery and projection.

There is therefore provided, in accordance with an embodiment of the invention, image projection apparatus, including an image generating assembly, which is configured to project a sequence of line images extending in a first direction. A scanning mirror is positioned to receive and to reflect the line images while rotating about a mirror axis parallel to the first direction. A pupil expander has an edge positioned to receive the line images reflected by the scanning mirror and a face extending in a second direction non-parallel to the first direction and to the edge, and which is configured to direct simultaneously through the face multiple, parallel replicas of the expanded line images arrayed along the second direction.

In a disclosed embodiment, the apparatus includes a controller, which is configured to drive the image generating assembly in synchronization with the scanning mirror so that the sequence of line images form successive raster lines in a two-dimensional image projected through the face of the pupil expander.

In some embodiments, the image generating assembly includes multiple emitters of optical radiation, arranged in a linear array extending in the first direction and collimation optics configured to receive, collimate, and project the optical radiation. A beam expander is configured to receive and expand the collimated radiation in the first direction so as to expand a pupil of the apparatus in the first direction. In a disclosed embodiment, the emitters are configured to emit the optical radiation at multiple different wavelengths, and the apparatus includes a controller, which is configured to modulate the emitters so as to generate respective pixels of the line images.

Additionally or alternatively, the beam expander includes an array of parallelepipedal, optically transparent prisms, which are disposed along the first direction. Typically, an interface between adjacent parallelepipedal prisms in the array includes an optical coating, which is configured to partially reflect and partially transmit the optical radiation impinging on the interface.

In alternative embodiments, the scanning mirror that is positioned to receive and to reflect the line images is a first scanning mirror, and the image generating assembly includes at least one source of optical radiation and collimation optics configured to receive, collimate, and project the optical radiation. A second scanning mirror is positioned to receive and to reflect the collimated optical radiation while rotating about a mirror axis parallel to the second direction. A beam expander is configured to receive the radiation reflected by the second scanning mirror and to expand the received radiation into a pupil that is expanded in the first direction. A controller is configured to drive and modulate the at least one source in synchronization with the second scanning mirror so as to form the line images.

In a disclosed embodiment, the at least one source of optical radiation includes a photonic integrated circuit including a substrate, multiple emitters on or in proximity to the substrate, and a plurality of waveguides, which are disposed on the substrate and include respective input ends coupled to respective ones of the emitters and output ends arranged in an array having a predefined pitch. Additionally or alternatively, the multiple emitters include at least three emitters configured to emit optical radiation at blue, green, and red wavelengths. Typically, the pitch is between 5 and 50 microns.

Further additionally or alternatively, the beam expander includes an optically transparent prism configured to propagate the radiation received from the second scanning mirror by total internal reflection, and the prism includes an internal partially reflective coating that splits the beam according to its dielctric design. The coating is configured to split the radiation propagated by the total internal reflection into multiple parts, which propagate in the prism by total internal reflection.

In a disclosed embodiment, the pupil expander is at least partially transparent to optical radiation.

In some embodiments, the apparatus includes an eyeglass frame, wherein the pupil expander is mounted in the frame so as to be positioned in front of an eye of a user of the apparatus who is wearing the frame.

There is also provided, in accordance with an embodiment of the invention, a method for image projection, which includes projecting a sequence of line images extending in a first direction toward a scanning mirror positioned to receive and to reflect the line images, and driving the scanning mirror to rotate about a mirror axis parallel to the first direction. The line images reflected by the scanning mirror are received through an edge of a pupil expander, which has a face extending in a second direction non-parallel to the first direction and to the edge, and which directs simultaneously through the face multiple, parallel replicas of the expanded line images arrayed along the second direction.

The present invention will be more fully understood from the following detailed description of the embodiments thereof, taken together with the drawings in which:

DETAILED DESCRIPTION OF EMBODIMENTS

Overview

A number of current applications, for example VR and AR systems, require an image projector to project a two-dimensional (2D) image collimated and distributed in angle space toward an area with a diagonal dimension of at least a few centimeters. This area may be termed the "eye box." An observer will locate the entrance pupil of the observer's eye in the eye box, which should be sufficiently large to accommodate the natural eye motions of the observer. There is a need for image projectors that are both compact and light-weight, with high optical resolution, high efficiency, and low power consumption.

The embodiments of the present invention that are described herein address the above needs so as to provide a compact and efficient image projector. The image projector is based on combining a one-dimensional (1D) image generating assembly with a scanning mirror and a pupil expander. The embodiments may also incorporate emitters, additional scanners, optical components, and photonic integrated circuits (PICs) to form the 1D image generating assembly.

In the disclosed embodiments, the image projector comprises an image generating assembly, which projects a sequence of line images extending in a first direction, for example the vertical direction in AR eyeglasses. A scanning mirror is positioned to receive and to reflect the line images while rotating about a mirror axis parallel to the first direction (a vertical axis in the above example). The scanning mirror reflects the line images in through the edge of a pupil expander, for example a pupil expander extending across the field of view of the eye in the AR eyeglasses. The face of the pupil expander, in other words, extends in a second direction non-parallel to the axis direction of the mirror and to the edge of the pupil expander. The pupil expander will thus direct simultaneously through the face (toward the eye of the person wearing the eyeglasses) multiple, parallel replicas of the expanded line images, with the replicas arrayed along the second direction. These light fields are arranged in the eye box, where the observer's eye will be located.

In display applications, such as in AR eyeglasses, the line image corresponds to a single raster line (along a vertical direction in the above example) within a two-dimensional (2D) image that is to be projected through the face of the pupil expander. The pixels of the line image are modulated in synchronization with the rotation of the mirror to generate successive lines of the 2D image, which are then projected by the beam expander at different, respective angles. In some embodiments, a controller is configured to drive the image generating assembly in synchronization with the scanning mirror based on the image content that is to be displayed, with each scan of the mirror corresponding to a successive image frame. Various types of pupil expanders may be used in conjunction with the image generating assembly for this purpose.

Embodiments of the present invention that are described hereinbelow provide a number of different types of 1D image generating assemblies. In some embodiments, the 1D image generating assembly comprises multiple emitters emitting optical radiation at several wavelengths. The outputs of the emitters are combined by a photonic integrated circuit (PIC) into a single multi-color output or an array of outputs, whose intensities and colors are modulated by fast modulation of the emitters. A fast scanning mirror, rotating about an axis perpendicular to the (slower) scanning mirror mentioned above, expands the output of the PIC to produce the 1D line image.

In alternative embodiments, the 1D image generating assembly comprises a linear array of optical emitters, which are modulated to generate a line image, along with optics to collimate and expand this line image to produce the 1D line image that is scanned by the scanning mirror. These embodiments obviate the need for a fast scanning mirror, though at the cost of a larger, and possibly more cumbersome, array of emitters.

Image Projection Apparatus Using an Emitter Array

Figure 1:
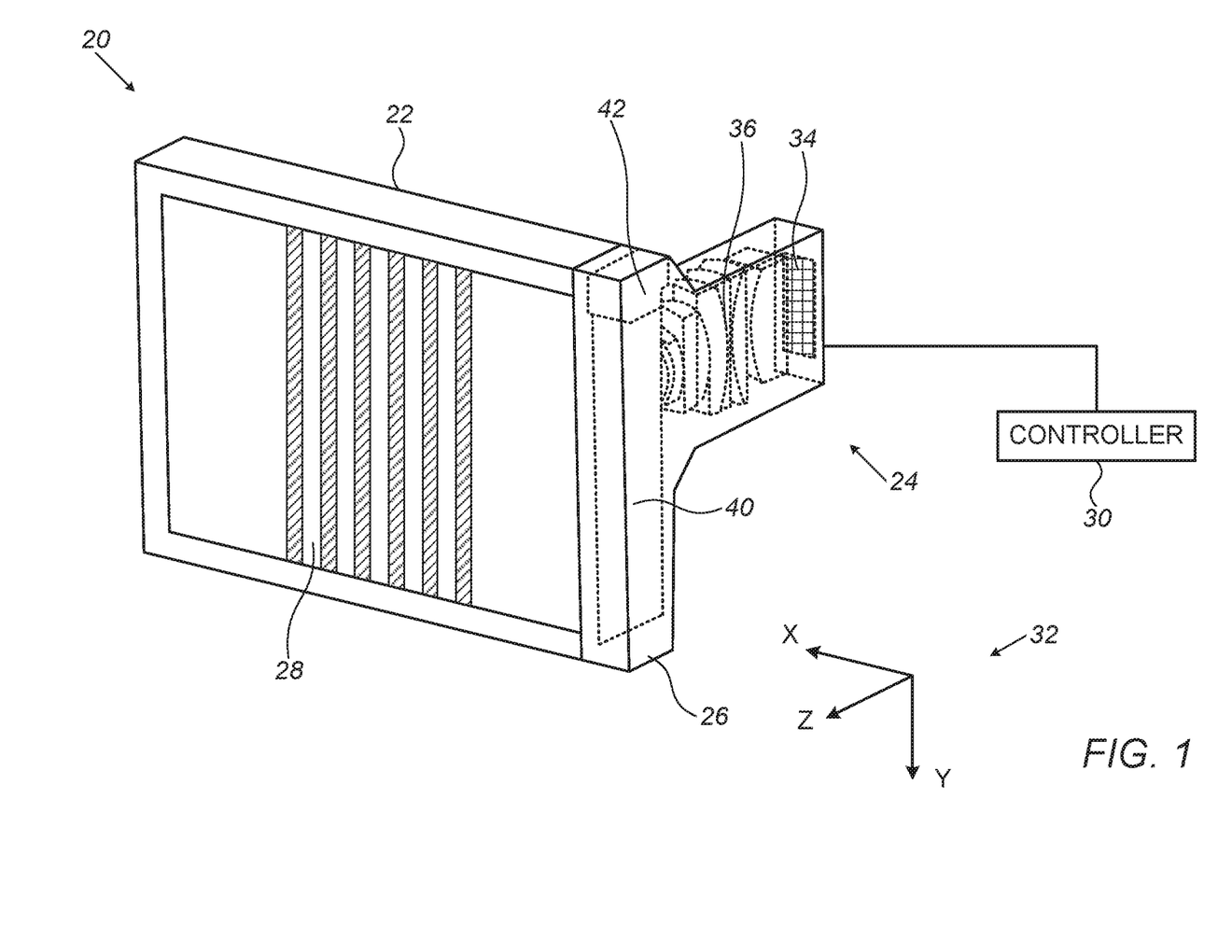
FIGS. 1 and 2 are schematic pictorial illustrations, in front and rear views, respectively, of an image projection apparatus, in accordance with an embodiment of the invention.
Figure 2:
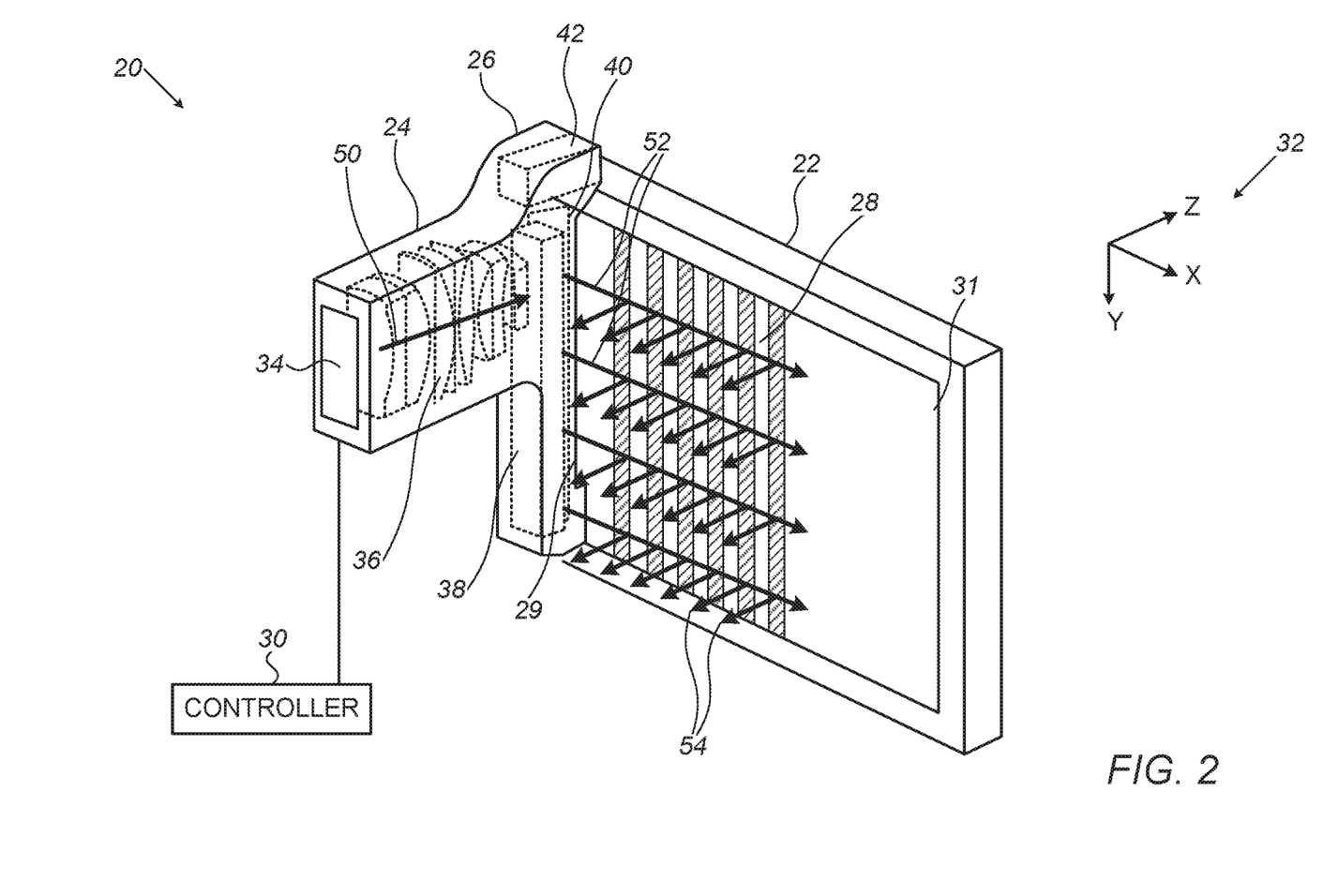

Reference is now made to FIGS. 1 and 2, which are schematic pictorial illustrations, in front and rear views, respectively, of an image projection apparatus 20, in accordance with an embodiment of the invention. Apparatus 20 may be used, for example, as part of an AR system, as well as in other image projection applications.

Apparatus 20 is based on a typical format of eyeglasses. For the sake of simplicity, only the left side of apparatus 20 (as referenced to an observer wearing the system) is shown. The right side is a mirror image of the left side. Alternatively, the right side may comprise only a lens with or without optical power, but without a display.

Apparatus 20 comprises a suitably modified eyeglass frame 22, a 1D image generating assembly 24, a scanning mirror assembly 26, and a 1D pupil expander 28. A controller 30 is coupled to image generating assembly 24 and to scanning mirror assembly 26. Pupil expander 28 is mounted in frame 22 so as to be positioned, in place of (or in parallel with) an eyeglass lens, in front of an eye of a user of apparatus 20 who is wearing the frame. Image generating assembly 24 and a scanning mirror assembly 26 are likewise mounted on frame 22, either internally (as shown in the figures) or externally.

Image generating assembly 24 comprises an emitter array 34, collimation optics 36, and a 1D beam expander 38. Collimation optics 36 are rotationally symmetrical, but have their apertures shaped to form rectangles so as to minimize the form factor of the design. This is accomplished due to the narrow horizontal dimension of emitter array 34. Emitter array 34 comprises a mostly linear array of vertical-cavity surface-emitting lasers (VCSELs) or micro-light-emitting diodes (micro-LEDs), with a large number of emitters, for example one thousand or several thousands, in the vertical direction, and a few emitters, for example three or four, in the horizontal direction. Alternatively, array 34 may comprise larger or smaller numbers of rows and/or columns of emitters. In the following, beam and pupil are used interchangeably. An image comprises multiple beams distributed in the angular domain.

Scanning mirror assembly 26 comprises an elongated rectangular first scanning mirror 40 and a mirror actuator 42, such as a galvanometer, with an axis of rotation of the scanning mirror assembly parallel to the Y-axis of a Cartesian coordinate system 32. In the pictured embodiment, the Y-axis is parallel to the vertical axis of the eyeglasses, as well as to the longitudinal axis of the body of a user of apparatus 20. (Cartesian coordinate system 32 is used for the sake of clarity and convenience only. Other coordinate systems may be alternatively used.) The dimensions of scanning mirror 40 are, for example, 20 mm × 5 mm, wherein the long dimension, along the axis of rotation, is determined by the dimension of pupil expander 28 in Y-direction. Minimizing the short dimension, perpendicular to the axis of rotation, enables high-speed scanning and makes it possible to integrate assembly 26 unobtrusively into the eyeglass frame of apparatus 20. The typical range of scan frequencies of scanning mirror assembly 26 is 30 Hz or higher, so that the image (as explained below with reference to FIG. 3) produced by a full angular scan is seen by an observer as one image. Alternatively, scanning mirror assembly 26 may comprise a long rotating polygon with an electric motor drive.

Pupil expander 28 comprises, for example, a waveguide, a surface grating, or a holographic element. Pupil expanders of these sorts are known in the art of AR displays, for example, and their details are beyond the scope of the present description.

Figure 3:
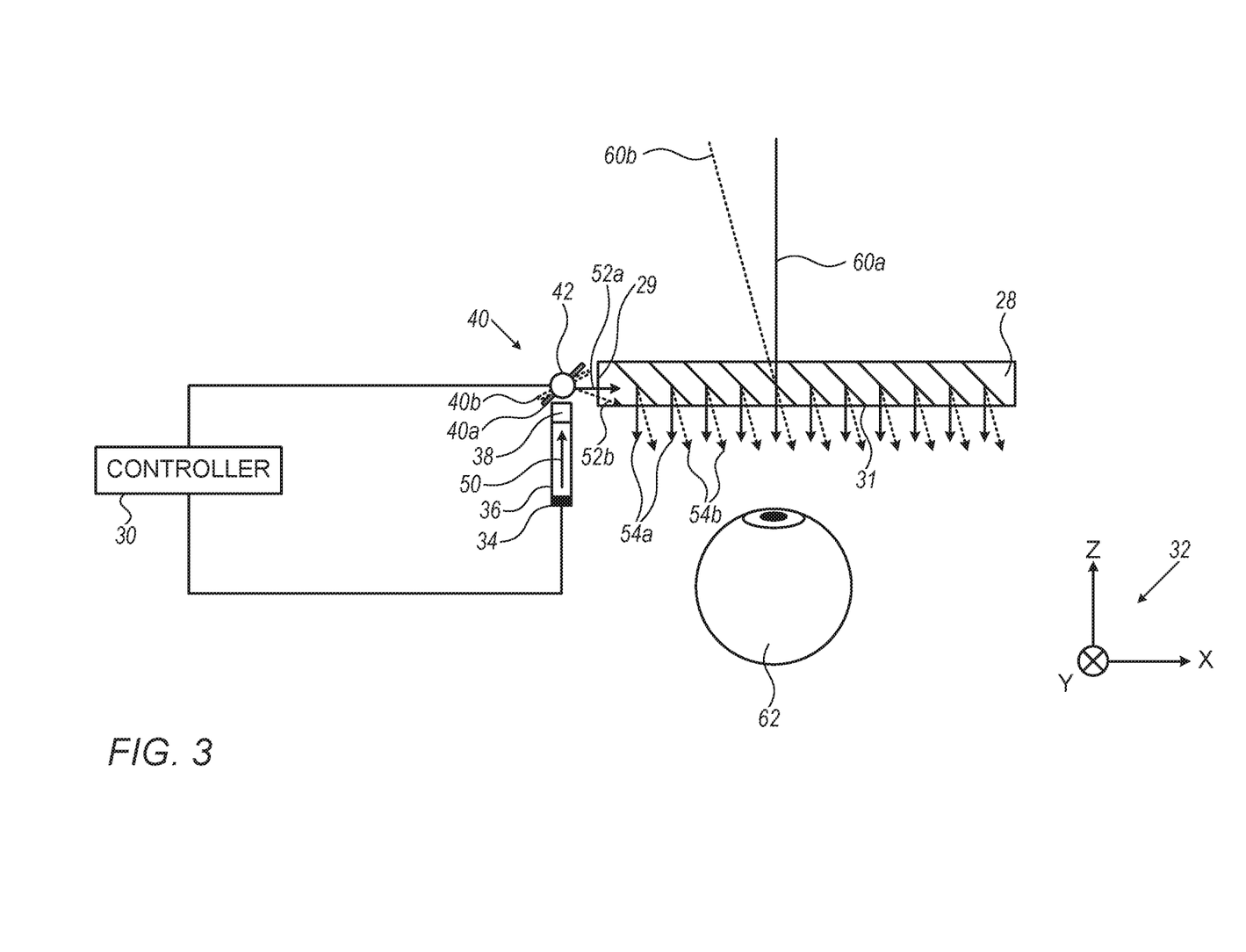
FIG. 3 is a schematic top view of the apparatus of FIGS. 1 and 2, in accordance with an embodiment of the invention.

FIG. 3 is a schematic top view of apparatus 20, in accordance with an embodiment of the invention. FIGS. 2 and 3 show the flow of optical signals from emitter array 34 to their exit from pupil expander 28. Emitter array 34 emits a 1D image comprising many beams, which are collimated by collimation optics 36 and are nominally projected in the Z-direction towards beam expander 38, as indicated by an arrow 50. Beam expander 38, in turn, expands the beams in the Y-direction. The angular range of the image (in the Y-direction) is determined by the length of emitter array 34 and the focal length of collimation optics 36. The spatial extent of the beam is determined by beam expander 38.

The expanded 1D image produced by beam expander 38 is reflected by mirror 40 over a range of angles toward the X-direction, entering pupil expander 28 through an edge 29, as indicated by arrows 52. This range of reflected angles defines the observed field-of-view in the X direction of the apparatus. Pupil expander 28 expands the received beams into multiple, parallel replicas arrayed across the X-direction and projects them through a face 31 (oriented in the X-Y-plane) toward the negative Z-direction, as shown by arrows 54.

As illustrated in FIG. 2, scanning mirror 40 receives the 1D image from emitter array 34 and collimation optics 36 through beam expander 38. Scanning mirror 40 is shown in FIG. 3 in two angular orientations labelled by 40a and 40b, wherein orientation 40a is shown by a solid line and orientation 40b is shown by a dotted line.

When scanning mirror 40 is in orientation 40a and receives the collimated and expanded beams that make up the 1D image, it reflects and projects the image as shown by an arrow 52a (solid arrow) into pupil expander 28 through its edge 29. Pupil expander 28, in turn, expands the image in the X-direction and emits this 2D image out of the pupil expander through face 31 into the (negative) Z-direction, as shown by solid arrows 54a. A solid line 60a, parallel to arrows 54a, indicates the direction where an eye 62, placed behind pupil expander 28 in system 20, would form an image corresponding to the line image reflected by scanning mirror 40 in orientation 40a. Thus, a given angular orientation of scanning mirror 40 corresponds to a given apparent direction of a 1D line image, where the observer can see a distant and resolvable object.

Similar considerations may be applied, when scanning mirror 40 is oriented in orientation 40b: The collimated, expanded, and reflected beams of the 1D image are now projected into pupil expander 28 along a dotted-line arrow 52b, which are converted into beams emitted along dotted-line arrows 54b. In this way the beams are expanded along the X-direction to fill a 2D eye box. A dotted line 60b indicates now the direction in which an image would be seen by eye 62.

Thus, driving both emitter array 34 and mirror actuator 42 by controller 30 in a synchronized manner, a full 2D image is displayed by apparatus 20. The term "full 2D image" refers to an image with a 2D extent in the angular domain. The 1D line image contained in the collimated beams reflected by scanning mirror 40 at all the different angular orientations form the raster lines of this 2D image. A typical spatial extent of the eye box containing the beams near the observer's eye is approximately 20 mm × 20 mm, and a typical angular extent of the image is ±10° × ±10°, although other spatial and angular extents of the eye box and the image, respectively, are possible. The scanning frequency of scanning mirror assembly 26 is sufficiently high so that the full angular extent in X-direction is observed as a single image by the human observer.

Figure 4:
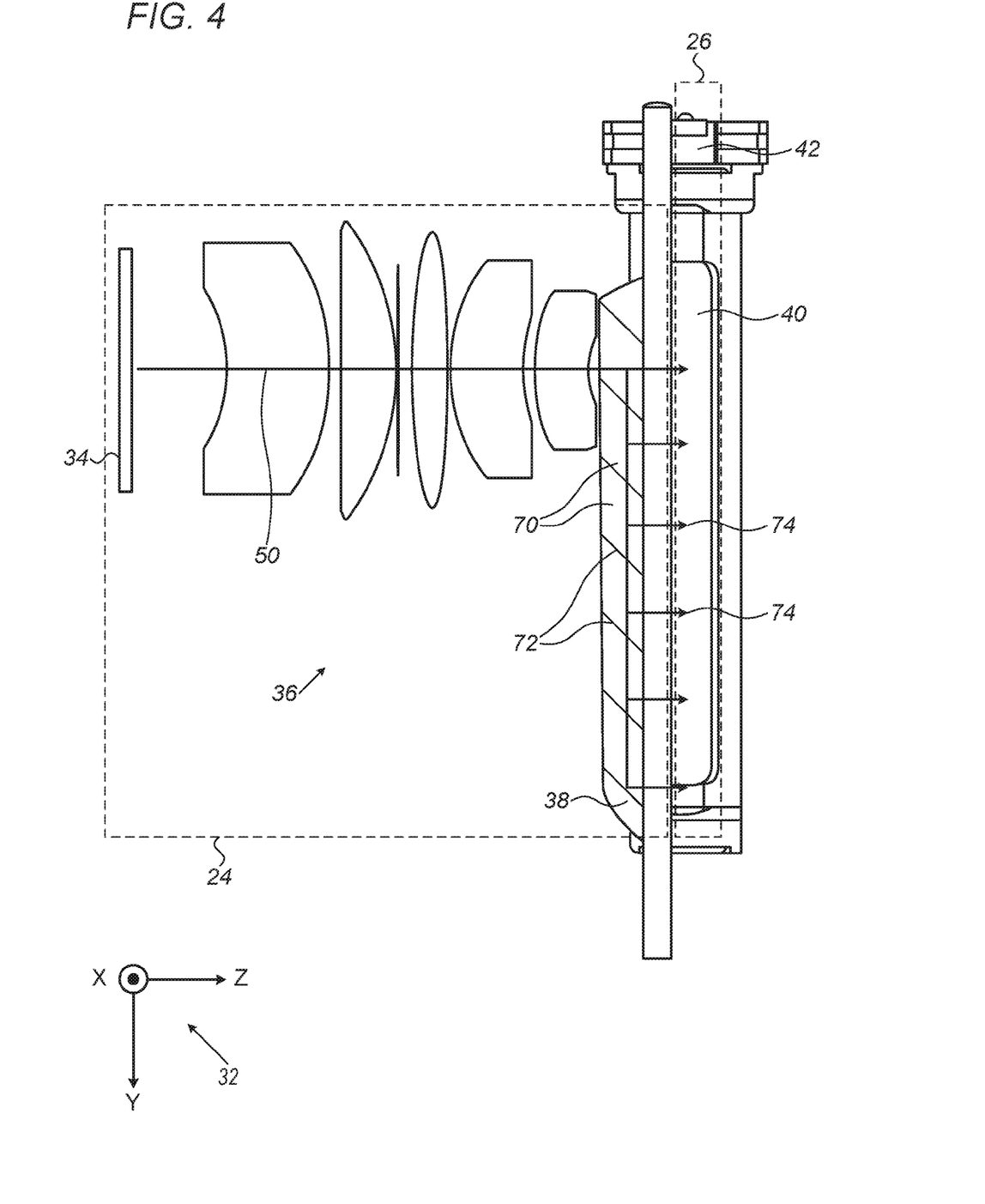
FIG. 4 is a schematic sectional view of an image projection apparatus, showing details of an image generating assembly and a scanning mirror assembly, in accordance with an embodiment of the invention.

FIG. 4 is a schematic sectional view of apparatus 20, showing details of image generating assembly 24 and scanning mirror assembly 26, in accordance with an embodiment of the invention.

As explained above with reference to FIG. 2, emitter array 34 emits a 1D section of the 2D image, which is collimated by collimation optics 36 and projected in the Z-direction towards beam expander 38, as indicated by arrow 50. Emitter array 34, collimation optics 36, and beam expander 38 together form a 1D image generating assembly 24. Beam expander 38 comprises multiple optically transparent parallelepipedal prisms 70, with partially reflecting coatings 72 between adjacent prisms. The 1D image represented by arrow 50 is repeatedly partially reflected and partially transmitted by parallelepipedal prisms 70, resulting in a 1D image expanded in the Y-direction, as shown by arrows 74. The expanded 1D image is projected onto scanning mirror 26, and from there towards pupil expander 28, as shown in FIG. 2.

Figure 5:
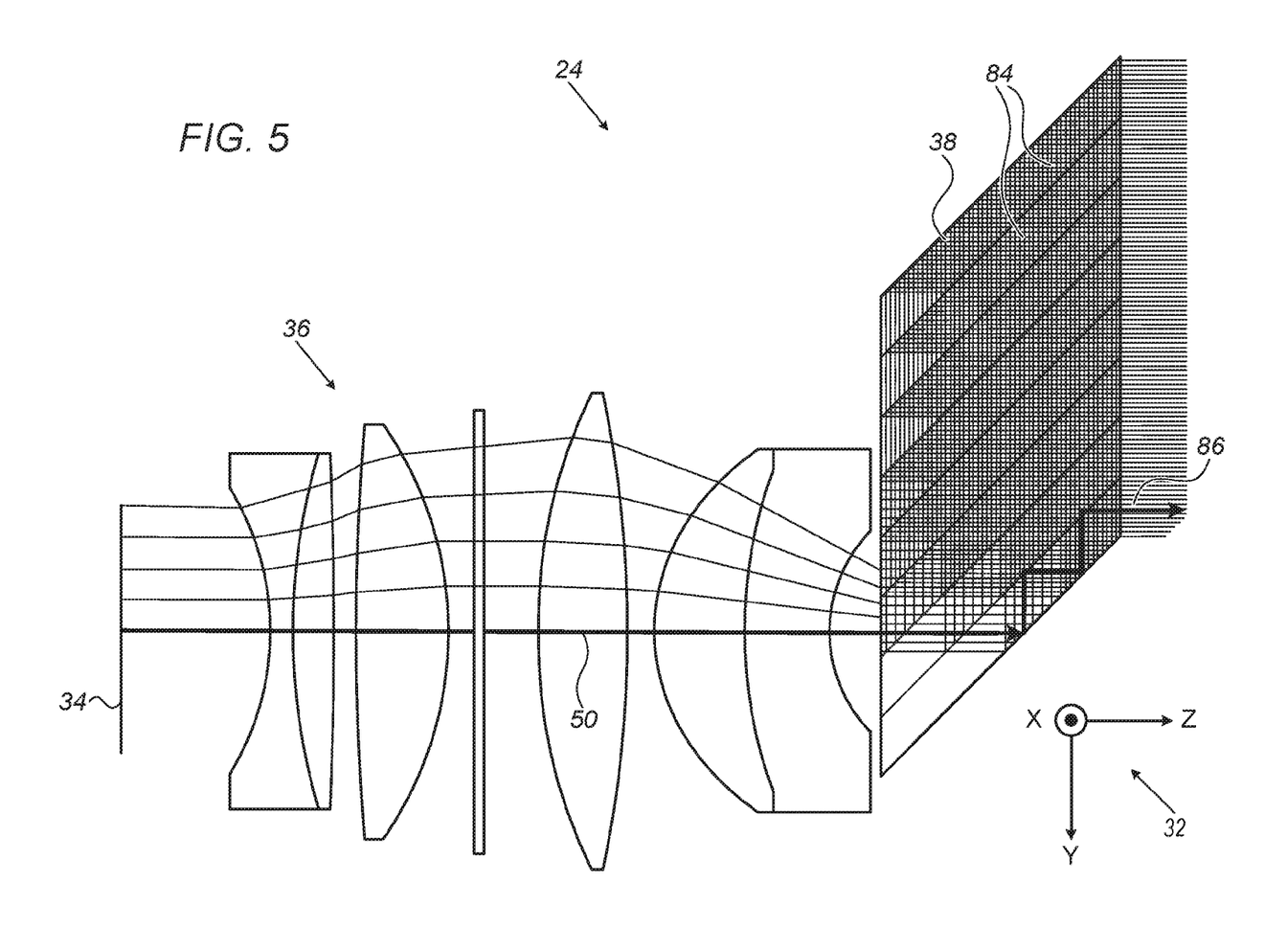
FIG. 5 is a schematic detail view of an image generating assembly, showing details of optical operation of a beam expander, in accordance with an embodiment of the invention.

FIG. 5 is a schematic detail view of image generating assembly 24, showing details of optical operation of beam expander 38, in accordance with an embodiment of the invention.

Beam expander 38 comprises parallelepipedal prisms 84, which are sufficiently thick in the Z-direction so that the collimated 1D image, represented by arrow 50, experiences several reflections within each prism, as represented, for example, by an arrow 86.

Figure 6:
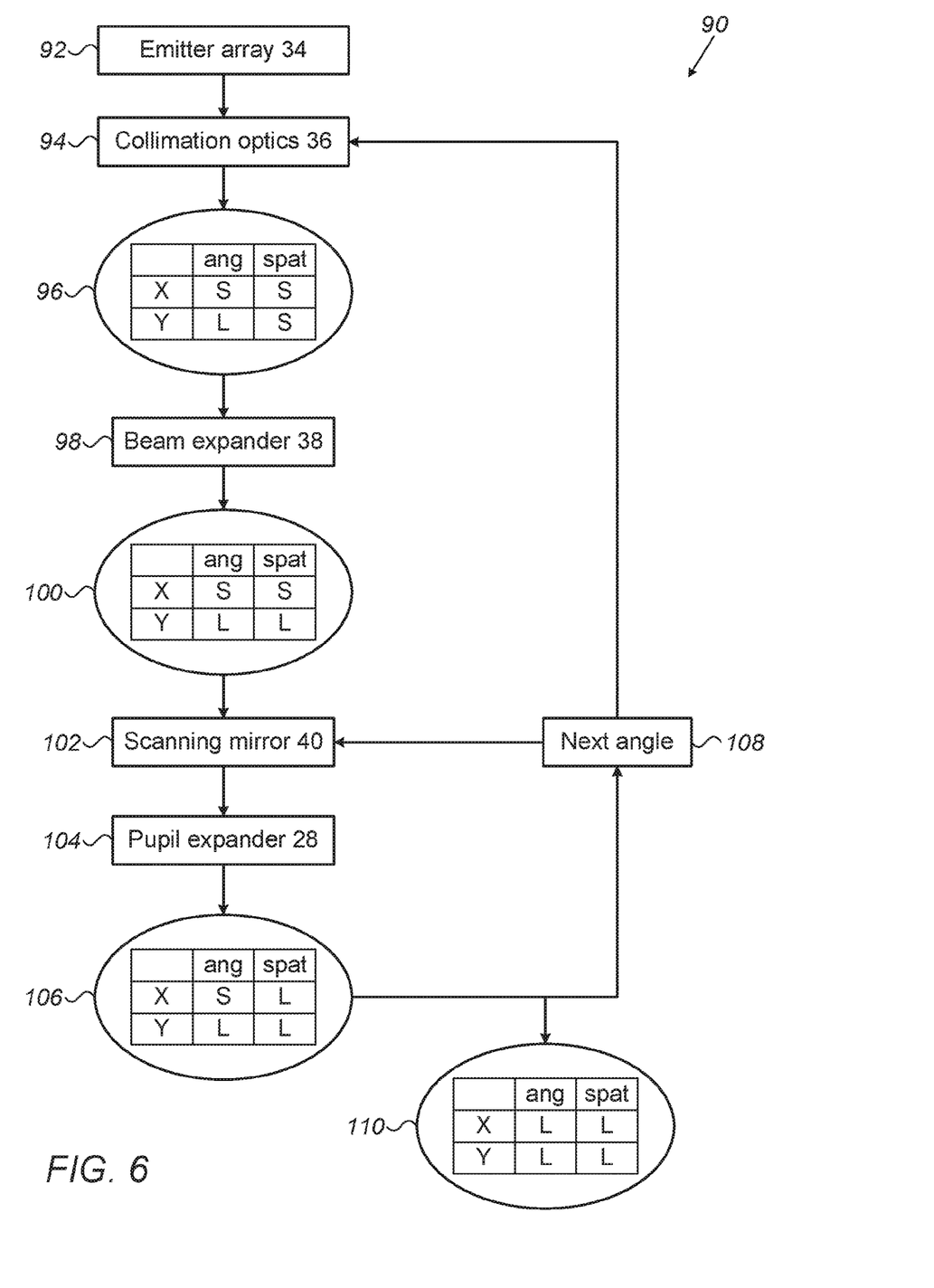
FIG. 6 is a flowchart that schematically shows a flow of optical signals in an image projection apparatus, in accordance with an embodiment of the invention.

FIG. 6 is a flowchart 90 that schematically shows the flow of optical signals in apparatus 20, in accordance with an embodiment of the invention. In flowchart 90, rectangles indicate a component or action of apparatus 20, and ellipses indicate an image and/or pupil produced by the preceding components or actions. The angular extent of the image and the spatial extent of the pupil are indicated within each ellipse by a table, such as Table 1 shown below as an example.

TABLE 1

Example of angular extent of an image and spatial extent of a pupil in X- and Y-directions (ang = angular, spat = spatial, S = small, L = large)

|   | ang | spat |
|---|-----|------|
| X | S   | S    |
| Y | L   | S    |

For the sake of brevity, we refer herein to angular extent as pertaining to the image and to spatial extent as pertaining to the pupil. Table 1 indicates an image and a pupil, wherein in the X-direction both angular and spatial extents are small, and wherein in the Y-direction the angular extent is large but spatial extent is small. A small angular extent indicates that only a narrow angular subset, such as 1°, of the final image is included, whereas a large angular extent indicates that a full angular view, such as ±10°, of the final image is included. A small spatial extent indicates a small pupil width, such as 1 mm, whereas a large spatial extent indicates a full width of the final pupil, which is the eye box, and can be 20 mm.

In an emission step 92, emitter array 34 emits an image with a full angular extent in the Y-direction (the direction of the emitter array), but with only a small angular extent in X-direction. In a collimation step 94, the image is collimated by collimation optics 36, producing, as indicated in a first image step 96, a collimated 1D image with a small beam diameter (small extent in both X- and Y-directions). The image from first image step 96 is expanded in the Y-direction by beam expander 38 in a beam expansion step 98, producing, as shown in a second image step 100, a 1D image where the image is large in the Y-direction but remains small in the X-direction.

The image from second image step 100 is received and scanned in a scan step 102 by scanning mirror 40 and projected into pupil expander 28, which in turn expands the pupil in a pupil expansion step 104. This produces a pupil with a large extent in both X- and Y-directions, but still only a small angular extent in the X-direction, as indicated in a third image step 106. A feedback step 108 takes the process back to emission step 92, where a 1D image corresponding to the next angular orientation of scanning mirror 40 is emitted, as illustrated in FIG. 3. Finally, when emitter array 34 and scanning mirror 40 have looped through the full angular extent of the image in X-direction, an image with full angular extent emitted from a pupil of full spatial extent is produced, as indicated in a fourth image step 110.

Image Projection Apparatus Using Dual Scanning Mirrors

Figure 7A:
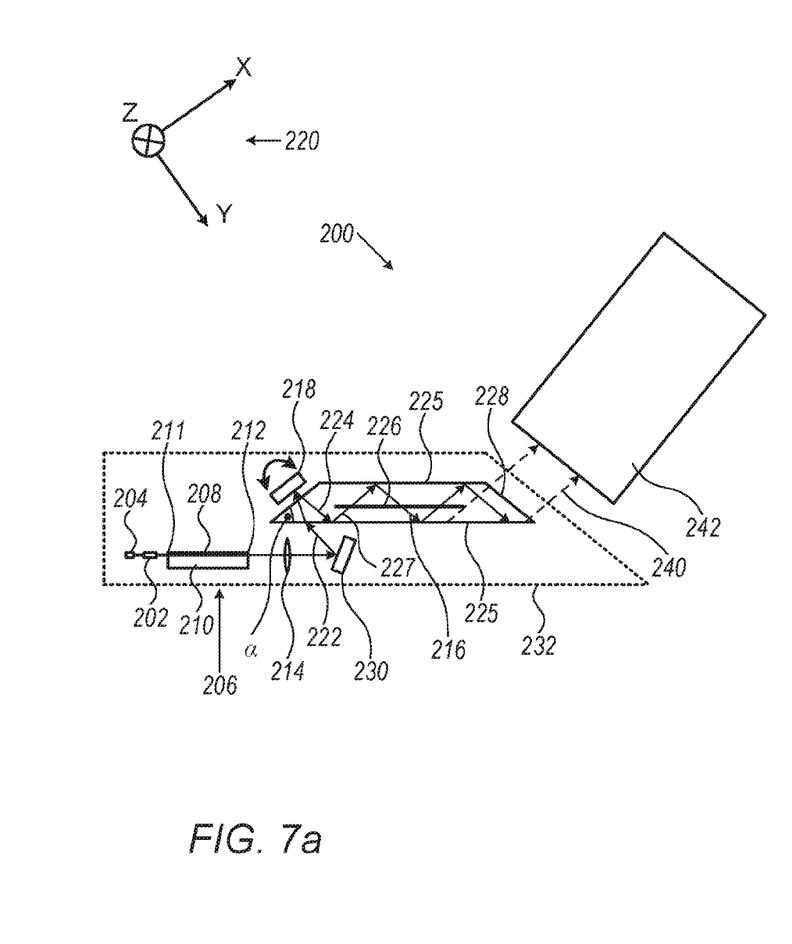
FIGS. 7a and 7b are schematic side and top views, respectively, of an image projection apparatus, in accordance with another embodiment of the invention.
Figure 7B:
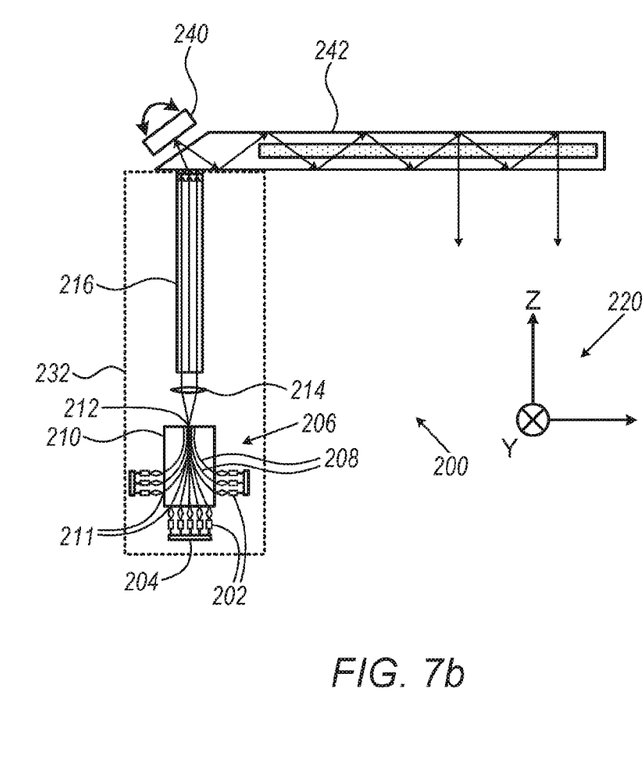

FIGS. 7a and 7b are schematic side and top views, respectively, of an image projection apparatus 200, in accordance with another embodiment of the invention.

Apparatus 200 comprises emitters 202, for example edge-emitting lasers, driven by drivers 204 and emitting light at different wavelengths, such as at RGB wavelengths, into a photonic integrated circuit (PIC) 206. PIC 206 comprises strip waveguides 208 formed on a substrate 210. (The term "strip waveguide" refers to a waveguide that is formed on a substrate and typically has a lateral dimension that does not exceed a few hundreds of nanometers or a few microns, such as 500 nm or 2 microns.) Waveguides 208 may be formed by a photolithographic process of, for example, silicon nitride ($Si_3N_4$) on a quartz ($SiO_2$) substrate 210. Emitters 202 can be coupled to input ends 211 of the respective waveguides 208 by edge coupling or by free-space beam-waist imaging optics. The paths of waveguides 208 are formed in such a way that at their exit ends 212 the neighboring waveguides are separated by small distances, for example, about 10 microns, or more generally, between 5 and 50 microns.

In one embodiment, emitters 202 comprise multiple groups of RGB emitters, and PIC 206 comprises one strip waveguide 208 for each emitter. In this case, multiple lines of pixels of the final 2D image may be generated simultaneously by suitable modulation of emitters 202. Thus, for example, with three groups of emitters 202, three lines with RGB wavelengths are generated simultaneously.

Apparatus 200 further comprises collimation optics 214, an optically transparent prism 216, and a fast-axis scanning mirror 218. Collimation optics 214 receive the light emitted by PIC 206, collimate it and project it through prism 216 onto fast-axis scanning mirror 218. Referring to FIG. 7a and to a Cartesian coordinate system 220, fast-axis scanning mirror 218 rotates around an axis parallel to the Z-axis. (For the sake of simplicity, fast-axis scanning mirror 218 is not shown in FIG. 7b. Cartesian coordinate system 220 is used for the sake of clarity and convenience only. Other coordinate systems may be alternatively used.)

Figure 8:
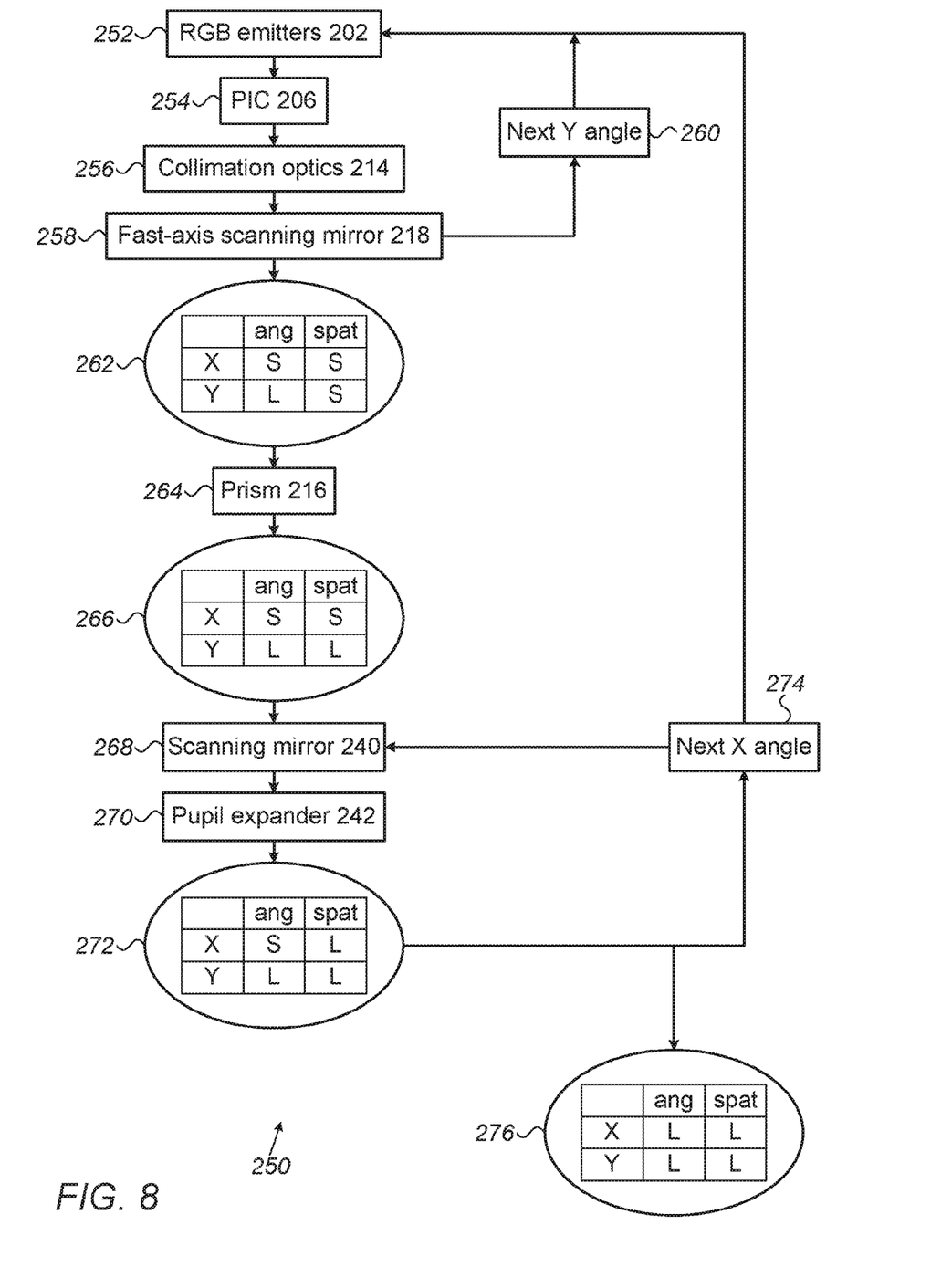
FIG. 8 is a flowchart that schematically shows a flow of optical signals in the apparatus of FIGS. 7a and 7b, in accordance with an embodiment of the invention.

As further detailed in FIG. 8, the scan of fast-axis scanning mirror 218, together with the temporal modulation of emitters 202, produces a 1D image oriented in the Y-direction. The scan frequency of fast-axis scanning mirror 218 is sufficiently high so that the fast-axis scanning mirror performs a full scan (produces a full 1D image in the Y-direction) for each scan position of a scanning mirror 240 scanning in the X-direction. The frequency of the fast-axis scan is typically in excess of 23 kHz, while the frequency of the slow-axis scan is between 90 and 120 Hz. Due to the requirement of a high scan frequency, fast-axis scanning mirror 218 typically comprises a lightweight mirror rotating in a resonant scanning mode. Alternatively, fast-axis scanning mirror 218 may comprise a high-speed rotating polygon, driven by an electric motor.

The directions of rays 222 from collimation optics 214 to prism 216 are arranged in such a way that, with a prism angle a, these rays pass through the prism onto fast-axis scanning mirror 218. Choosing the range of rotation angles of fast-axis scanning mirror 218 appropriately, rays 224 reflected from the fast-axis scanning mirror enter prism 216 and are then "trapped" in the prism due to total internal reflection (TIR) from long faces 225 of the prism. A folding mirror 230 may be used for beam folding for a compact design of apparatus 200. Prism 216 comprises an internal 50/50 beam splitting coating 226, parallel to long faces 225, which, in conjunction with the bouncing of trapped rays 227 within the prism, produces multiple copies of the rays. Modulating emitters 202 temporally in synchronization with the rotation of fast-axis scanning mirror 218, together with the ray multiplication within prism 216, produces a 1D image in the Y-direction at an exit face 228 of prism 216.

PIC 206 with emitters 202 and drivers 204, together with collimation optics 214, prism 216, and fast-axis scanning mirror 218 form a 1D image generating assembly 232, which generates a 1D image that extends in the Y-direction, similar to the 1-D image produced by image generating assembly 24, as shown in the preceding figures.

The 1D image exiting from exit face 228 is projected onto scanning mirror 240, and from there into a pupil expander 242. Scanning mirror 240 and pupil expander 242 are either identical with or similar to scanning mirror 40 and pupil expander 28 of FIGS. 1-4.

FIG. 8 is a flowchart 250 that schematically shows the flow of optical signals in apparatus 200, in accordance with an embodiment of the invention. In flowchart 250 (similarly to flowchart 90), rectangles indicate a component or action of apparatus 200, and ellipses indicate an image and/or pupil produced by the preceding components or actions. Tables within the ellipses indicate the image extents.

In an emission step 252, RGB emitters 202 emit respective optical signals into PIC 206, which, in waveguiding step 254, projects the optical signals into collimation optics 214. In collimation step 256, collimation optics 214 collimate and project the optical signals onto fast-axis scanning mirror 218, which produces 1D image in a first scanning step 258. Through a next-Y step 260, RGB emitters 202 emit a new optical signal for each respective new rotation angle of fast-axis scanning mirror 218.

The resulting image is indicated in a first image step 262 (corresponding to first image step 96 in flowchart 90.) In a prism step 264, the combination of a small-diameter pupil and a small-angle image passes through prism 216, and is expanded into a 1D nominal pupil with a large spatial extent in the Y-direction, as shown in a second image step 266 (corresponding to second image step 100 in flowchart 90). Similarly to flowchart 90, the image from second image step 266 is received and scanned in a scan step 268 by scanning mirror 240 and projected into pupil expander 242, which in turn expands the pupil in a pupil expansion step 270. This produces, in a third image step 272, an image emitted from a pupil of a large spatial extent in both X- and Y-directions and a large angular extent in the Y-direction, but still a small angular extent in the X-direction. A feedback step 274 takes the process back to the next orientation of scanning mirror 240 and to the loop comprising steps 252-260, where a 1D image corresponding to the next angular orientation of scanning mirror 240 is emitted. Finally, with repeated loops through feedback step 274, an image emitted from a pupil with a full spatial extent with the desired angular extents of the final image is produced, as indicated in a fourth image step 276.

Figure 9:
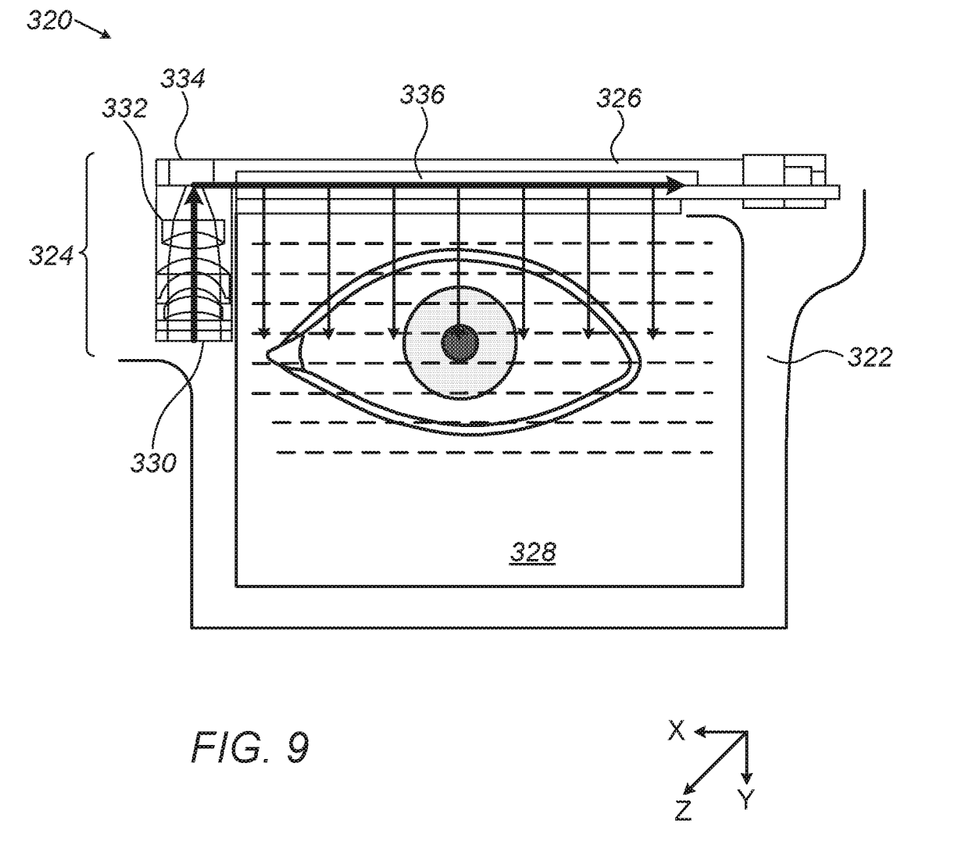
FIG. 9 is a schematic frontal view of an image projection apparatus, in accordance with an alternative embodiment of the invention.

FIG. 9 is a schematic frontal view of an image projection apparatus 320, in accordance with an alternative embodiment of the invention. The principles of this embodiment are similar to those of the preceding embodiments, with an image generating assembly 324, a scanning mirror 326, and a pupil expander 328 mounted in an eyeglass frame 322. In the present embodiment, however, the line images output by image generating assembly 324, as well as the rotational axis of mirror 326, extend in the X-direction, meaning that they will be perpendicular to the longitudinal axis of the body of a user who is wearing frame 322.

As in the embodiment of FIGS. 7a/b, collimation optics 332 collect the light output by emitters 330 and direct the resulting beams toward a fast-axis scanning mirror 334, which rotates about the Z-axis. Scanning mirror 334 directs the scanned beam into a 1D beam expander 336, which produces line images extending across the X-direction. Scanning mirror 326 serves as the slow-axis scanning mirror and reflects the line images in the Y-direction, into pupil expander 328. The pupil expander thus directs two-dimensional images in the -Z direction, toward the eye of the user.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:
1. Image projection apparatus, comprising:
an image generating assembly, which is configured to project a sequence of line images extending in a first direction;
a scanning mirror positioned to receive and to reflect the line images while rotating about a mirror axis parallel to the first direction; and
a pupil expander, which has an edge positioned to receive the line images reflected by the scanning mirror and a face extending in a second direction non-parallel to the first direction and to the edge, and which is configured to direct simultaneously through the face multiple, parallel replicas of the line images arrayed along the second direction.

2. The apparatus according to claim 1, and comprising a controller, which is configured to drive the image generating assembly in synchronization with the scanning mirror so that the sequence of line images form successive raster lines in a two-dimensional image projected through the face of the pupil expander.

3. The apparatus according to claim 1, wherein the scanning mirror that is positioned to receive and to reflect the line images is a first scanning mirror, and wherein the image generating assembly comprises:
at least one source of optical radiation;
collimation optics configured to receive, collimate, and project the optical radiation;
a second scanning mirror positioned to receive and to reflect the collimated optical radiation while rotating about a mirror axis parallel to the second direction;
a beam expander configured to receive the radiation reflected by the second scanning mirror and to expand the received radiation into a pupil that is expanded in the first direction; and
a controller, which is configured to drive and modulate the at least one source in synchronization with the second scanning mirror so as to form the line images.

4. The apparatus according to claim 3, wherein the at least one source of optical radiation comprises a photonic integrated circuit comprising:
a substrate;
multiple emitters on or in proximity to the substrate; and
a plurality of waveguides, which are disposed on the substrate and comprise respective input ends coupled to respective ones of the emitters and output ends arranged in an array having a predefined pitch.

5. The apparatus according to claim 4, wherein the multiple emitters comprise at least three emitters configured to emit optical radiation at blue, green, and red wavelengths.

6. The apparatus according to claim 4, wherein the pitch is between 5 and 50 microns.

7. The apparatus according to claim 4, wherein the beam expander comprises an optically transparent prism configured to propagate the radiation received from the second scanning mirror by total internal reflection, and wherein the prism comprises an internal beam splitting coating configured to split the radiation propagated by the total internal reflection into multiple parts, which propagate in the prism by total internal reflection.

8. The apparatus according to claim 1, wherein the pupil expander is at least partially transparent to optical radiation.

9. The apparatus according to claim 1, and comprising an eyeglass frame, wherein the pupil expander is mounted in the frame so as to be positioned in front of an eye of a user of the apparatus who is wearing the frame.

10. The apparatus according to claim 9, wherein the first direction is parallel to a longitudinal axis of a body of the user who is wearing the frame.

11. The apparatus according to claim 9, wherein in the first direction is perpendicular to a longitudinal axis of a body of the user who is wearing the frame.

12. Image projection apparatus, comprising:
   an image generating assembly, which is configured to project a sequence of line images extending in a first direction and comprises:
      multiple emitters of optical radiation, arranged in a linear array extending in the first direction;
      collimation optics configured to receive, collimate, and project the optical radiation; and
      a beam expander configured to receive and expand the collimated radiation in the first direction so as to expand a pupil of the apparatus in the first direction;
   a scanning mirror positioned to receive and to reflect the line images while rotating about a mirror axis parallel to the first direction; and
   a pupil expander, which has an edge positioned to receive the line images reflected by the scanning mirror and a face extending in a second direction non-parallel to the first direction and to the edge, and which is configured to direct simultaneously through the face multiple, parallel replicas of the line images arrayed along the second direction.

13. The apparatus according to claim 12, wherein the emitters are configured to emit the optical radiation at multiple different wavelengths, and the apparatus comprises a controller, which is configured to modulate the emitters so as to generate respective pixels of the line images.

14. The apparatus according to claim 12, wherein the beam expander comprises an array of parallelepipedal, optically transparent prisms, which are disposed along the first direction.

15. The apparatus according to claim 14, wherein an interface between adjacent parallelepipedal prisms in the array comprises an optical coating, which is configured to partially reflect and partially transmit the optical radiation impinging on the interface.

16. A method for image projection, comprising:
   projecting a sequence of line images extending in a first direction toward a scanning mirror positioned to receive and to reflect the line images;
   driving the scanning mirror to rotate about a mirror axis parallel to the first direction; and
   receiving the line images reflected by the scanning mirror through an edge of a pupil expander, which has a face extending in a second direction non-parallel to the first direction and to the edge, and which directs simultaneously through the face multiple, parallel replicas of the line images arrayed along the second direction.

17. The method according to claim 16, wherein projecting the sequence of line images comprises generating the line images in synchronization with the scanning mirror so that the sequence of line images form successive raster lines in a two-dimensional image projected through the face of the pupil expander.

18. The method according to claim 16, wherein the line images are generated by an image generating assembly, which comprises:
   multiple emitters of optical radiation, arranged in a linear array extending in the first direction;
   collimation optics configured to receive, collimate, and project the optical radiation; and
   a beam expander configured to receive and expand the collimated radiation in the first direction so as to expand a pupil of the method in the first direction.

19. The method according to claim 16, wherein the scanning mirror that is positioned to receive and to reflect the line images is a first scanning mirror, and wherein the line images are generated by an image generating assembly, which comprises:
   at least one source of optical radiation;
   collimation optics configured to receive, collimate, and project the optical radiation;
   a second scanning mirror positioned to receive and to reflect the collimated optical radiation while rotating about a mirror axis parallel to the second direction; and
   a beam expander configured to receive the radiation reflected by the second scanning mirror and to expand the received radiation into a pupil that is expanded in the first direction,
   wherein generating the line images comprises driving and modulating the at least one source in synchronization with the second scanning mirror so as to form the line images.

20. The method according to claim 19, wherein the beam expander comprises an optically transparent prism configured to propagate the radiation received from the second scanning mirror by total internal reflection, and wherein the prism comprises an internal beam splitting coating configured to split the radiation propagated by the total internal reflection into multiple parts, which propagate in the prism by total internal reflection.

* * * * *